United States Patent
Hori et al.

(10) Patent No.: US 10,417,498 B2
(45) Date of Patent: Sep. 17, 2019

(54) METHOD AND SYSTEM FOR MULTI-MODAL FUSION MODEL

(71) Applicant: Mitsubishi Electric Research Laboratories, Inc., Cambridge, MA (US)

(72) Inventors: Chiori Hori, Lexington, MA (US); Takaaki Hori, Lexington, MA (US); John Hershey, Winchester, MA (US); Tim Marks, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 231 days.

(21) Appl. No.: 15/472,797

(22) Filed: Mar. 29, 2017

(65) Prior Publication Data

US 2018/0189572 A1 Jul. 5, 2018

Related U.S. Application Data

(60) Provisional application No. 62/440,433, filed on Dec. 30, 2016.

(51) Int. Cl.
*G06K 9/00* (2006.01)
*G06K 9/46* (2006.01)
(Continued)

(52) U.S. Cl.
CPC ....... *G06K 9/00744* (2013.01); *G06F 16/783* (2019.01); *G06F 17/28* (2013.01);
(Continued)

(58) Field of Classification Search
CPC .......... G06K 9/00744; G06K 9/00718; G06K 9/4671; G06F 17/30784; G06F 17/28;
(Continued)

(56) References Cited

U.S. PATENT DOCUMENTS

2016/0342895 A1  11/2016  Gao et al.

OTHER PUBLICATIONS

Yu, Haonan, et al. "Video paragraph captioning using hierarchical recurrent neural networks." Proceedings of the IEEE conference on computer vision and pattern recognition. 2016. (Year: 2016).*

(Continued)

*Primary Examiner* — Menatoallah Youssef
(74) *Attorney, Agent, or Firm* — Gennadiy Vinokur; James McAleenan; Hironori Tsukamoto

(57) ABSTRACT

A system for generating a word sequence includes one or more processors in connection with a memory and one or more storage devices storing instructions causing operations that include receiving first and second input vectors, extracting first and second feature vectors, estimating a first set of weights and a second set of weights, calculating a first content vector from the first set of weights and the first feature vectors, and calculating a second content vector, transforming the first content vector into a first modal content vector having a predetermined dimension and transforming the second content vector into a second modal content vector having the predetermined dimension, estimating a set of modal attention weights, generating a weighted content vector having the predetermined dimension from the set of modal attention weights and the first and second modal content vectors, and generating a predicted word using the sequence generator.

20 Claims, 11 Drawing Sheets

(51) Int. Cl.
- *G06N 3/04* (2006.01)
- *G06F 17/28* (2006.01)
- *G10L 25/30* (2013.01)
- *G10L 25/57* (2013.01)
- *G06F 16/783* (2019.01)
- *H04N 21/439* (2011.01)
- *H04N 21/2343* (2011.01)
- *H04N 21/8549* (2011.01)

(52) U.S. Cl.
CPC ....... *G06K 9/00718* (2013.01); *G06K 9/4671* (2013.01); *G06N 3/0445* (2013.01); *G06N 3/0454* (2013.01); *G10L 25/30* (2013.01); *G10L 25/57* (2013.01); *H04N 21/234336* (2013.01); *H04N 21/4394* (2013.01); *H04N 21/8549* (2013.01)

(58) Field of Classification Search
CPC .... G06N 3/0445; G06N 3/0454; G10L 25/30; G10L 25/57; H04N 21/8549; H04N 21/234336; H04N 21/4394
See application file for complete search history.

(56) References Cited

OTHER PUBLICATIONS

Chen, Shizhe, and Qin Jin. "Multi-modal conditional attention fusion for dimensional emotion prediction." Proceedings of the 2016 ACM on Multimedia Conference. ACM, 2016.. (Year: 2016).*

Yu et al., "Video Paragraph Captioning using Hierarchical Recurrent Neural Networks," 2016 IEEE Conference on Computer Vision and Pattern Recognition, IEEE, Jun. 27, 2016, pp. 4584-4593.

Bulterman et al., "Multi-Modal Condigional Attention Fusion for Dimensional Emotion Prediction," Proceedings of the 2016 ACM on Multimedia Conference, MM Oct. 15, 2016,-Oct. 19, 2016. pp. 571-575.

Yin et al., "Abcnn: Attention based convolutional neural network for modeling sentence pairs," Dec. 16, 2015. retrieved from the internet, http://arxiv.org/pdf/1512.05193v2.pdf, retrieved Mar. 27, 2018.

Chao et al., "audio visual emotion recognition with temporal alignment and perception attention," Mar. 28, 2016. retrieved from the internet, https://arxiv.org/ftp/arxiv/papers/1603/1603.08321.pdf, retrieved Mar. 27, 2018.

Hori et al., "Attention based multimodal fusion for video description," 2017 IEEE international conference on Computer Vision, IEEE. Oct. 22, 2017. pp. 4203-4212.

* cited by examiner

| Fusion method | Attention | Modalities (feature types) | | | Evaluation metric | | | | | |
|---|---|---|---|---|---|---|---|---|---|---|
| | | Image | Spatiotemporal | Audio | BLEU1 | BLEU2 | BLEU3 | BLEU4 | METEOR | CIDEr |
| Unimodal | Temporal | GoogLeNet | | | 0.763 | 0.644 | 0.549 | 0.449 | 0.294 | 0.534 |
| Unimodal | Temporal | VGGNet | | | 0.789 | 0.673 | 0.578 | 0.472 | 0.305 | 0.595 |
| Unimodal | Temporal | | C3D | | 0.784 | 0.664 | 0.568 | 0.467 | 0.296 | 0.549 |
| Simple Multimodal | Temporal | VGGNet | C3D | | 0.800 | 0.679 | 0.581 | 0.478 | 0.309 | 0.614 |
| Multimodal Attention | Temporal & Multimodal | VGGNet | C3D | | 0.811 | 0.703 | 0.607 | 0.503 | 0.318 | 0.634 |
| Simple Multimodal | Temporal | VGGNet | C3D | MFCC | 0.774 | 0.649 | 0.552 | 0.448 | 0.306 | 0.578 |
| Multimodal Attention | Temporal & Multimodal | VGGNet | C3D | MFCC | 0.801 | 0.688 | 0.593 | 0.496 | 0.310 | 0.655 |

FIG. 8

METHOD AND SYSTEM FOR MULTI-MODAL FUSION MODEL

FIELD OF THE INVENTION

This invention generally relates to a method and system for describing multi-modal data, and more specifically to a method and system for video description.

BACKGROUND OF THE INVENTION

Automatic video description, known as video captioning, refers to the automatic generation of a natural language description (e.g., a sentence) that narrates an input video. Video description can be widespread applications including video retrieval, automatic description of home movies or online uploaded video clips, video descriptions for the visually impaired, warning generation for surveillance systems and scene understanding for knowledge sharing between human and machine.

Video description systems extract salient features from the video data, which may be multimodal features such as image features representing some objects, motion features representing some actions, and audio features indicating some events, and generate a description narrating events so that the words in the description are relevant to those extracted features and ordered appropriately as natural language.

One inherent problem in video description is that the sequence of video features and the sequence of words in the description are not synchronized. In fact, objects and actions may appear in the video in a different order than they appear in the sentence. When choosing the right words to describe something, only the features that directly correspond to that object or action are relevant, and the other features are a source of clutter. In addition, some events are not always observed in all features.

Accordingly, there is a need to use different features inclusively or selectively to infer each word of the description to achieve high-quality video description.

SUMMARY OF THE INVENTION

Some embodiments of a present disclosure are based on generating content vectors from input data including multiple modalities. In some cases, the modalities may be audio signals, video signals (image signals) and motion signals contained in video signals.

The present disclosure is based on a multimodal fusion system that generates the content vectors from the input data that include multiple modalities. In some cases, the multi-modal fusion system receives input signals including image (video) signals, motion signals and audio signals and generates a description narrating events relevant to the input signals.

According to embodiments of the present disclosure, a system for generating a word sequence from multi-modal input vectors include one or more processors and one or more storage devices storing instructions that are operable, when executed by the one or more processors, to cause the one or more processors to perform operations that include receiving first and second input vectors according to first and second sequential intervals; extracting first and second feature vectors using first and second feature extractors, respectively, from the first and second input; estimating a first set of weights and a second set of weights, respectively, from the first and second feature vectors and a prestep context vector of a sequence generator; calculating a first content vector from the first set of weights and the first feature vectors, and calculating a second content vector from the second set of weights and the second feature vectors; transforming the first content vector into a first modal content vector having a predetermined dimension and transforming the second content vector into a second modal content vector having the predetermined dimension; estimating a set of modal attention weights from the pre-step context vector and the first and second content vectors or the first and second modal content vectors; generating a weighted content vector having the predetermined dimension from the set of modal attention weights and the first and second modal content vectors; and generating a predicted word using the sequence generator for generating the word sequence from the weighted content vector.

Further, some embodiments of the present disclosure provide a non-transitory computer-readable medium storing software comprising instructions executable by one or more processors which, upon such execution, cause the one or more processors to perform operations. The operations include receiving first and second input vectors according to first and second sequential intervals; extracting first and second feature vectors using first and second feature extractors, respectively, from the first and second input; estimating a first set of weights and a second set of weights, respectively, from the first and second feature vectors and a prestep context vector of a sequence generator; calculating a first content vector from the first set of weights and the first feature vectors, and calculating a second content vector from the second set of weights and the second feature vectors; transforming the first content vector into a first modal content vector having a predetermined dimension and transforming the second content vector into a second modal content vector having the predetermined dimension; estimating a set of modal attention weights from the pre-step context vector and the first and second content vectors or the first and second modal content vectors; generating a weighted content vector having the predetermined dimension from the set of modal attention weights and the first and second modal content vectors; and generating a predicted word using the sequence generator for generating the word sequence from the weighted content vector.

According to another embodiment of the present disclosure, a method for generating a word sequence from multi-modal input vectors from multi-modal input vectors, includes receiving first and second input vectors according to first and second sequential intervals; extracting first and second feature vectors using first and second feature extractors, respectively, from the first and second input; estimating a first set of weights and a second set of weights, respectively, from the first and second feature vectors and a prestep context vector of a sequence generator; calculating a first content vector from the first set of weights and the first feature vectors, and calculating a second content vector from the second set of weights and the second feature vectors; transforming the first content vector into a first modal content vector having a predetermined dimension and transforming the second content vector into a second modal content vector having the predetermined dimension; estimating a set of modal attention weights from the pre-step context vector and the first and second content vectors or the first and second modal content vectors; generating a weighted content vector having the predetermined dimension from the set of modal attention weights and the first and second modal content vectors; and generating a predicted word using the sequence generator for generating the word sequence from the weighted content vector.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 8 shows comparisons of performance results obtained by conventional methods and the multimodal attention method according to embodiments of the present disclosure;

DETAILED DESCRIPTION OF THE PREFERRED EMBODIMENTS

Figure 1:
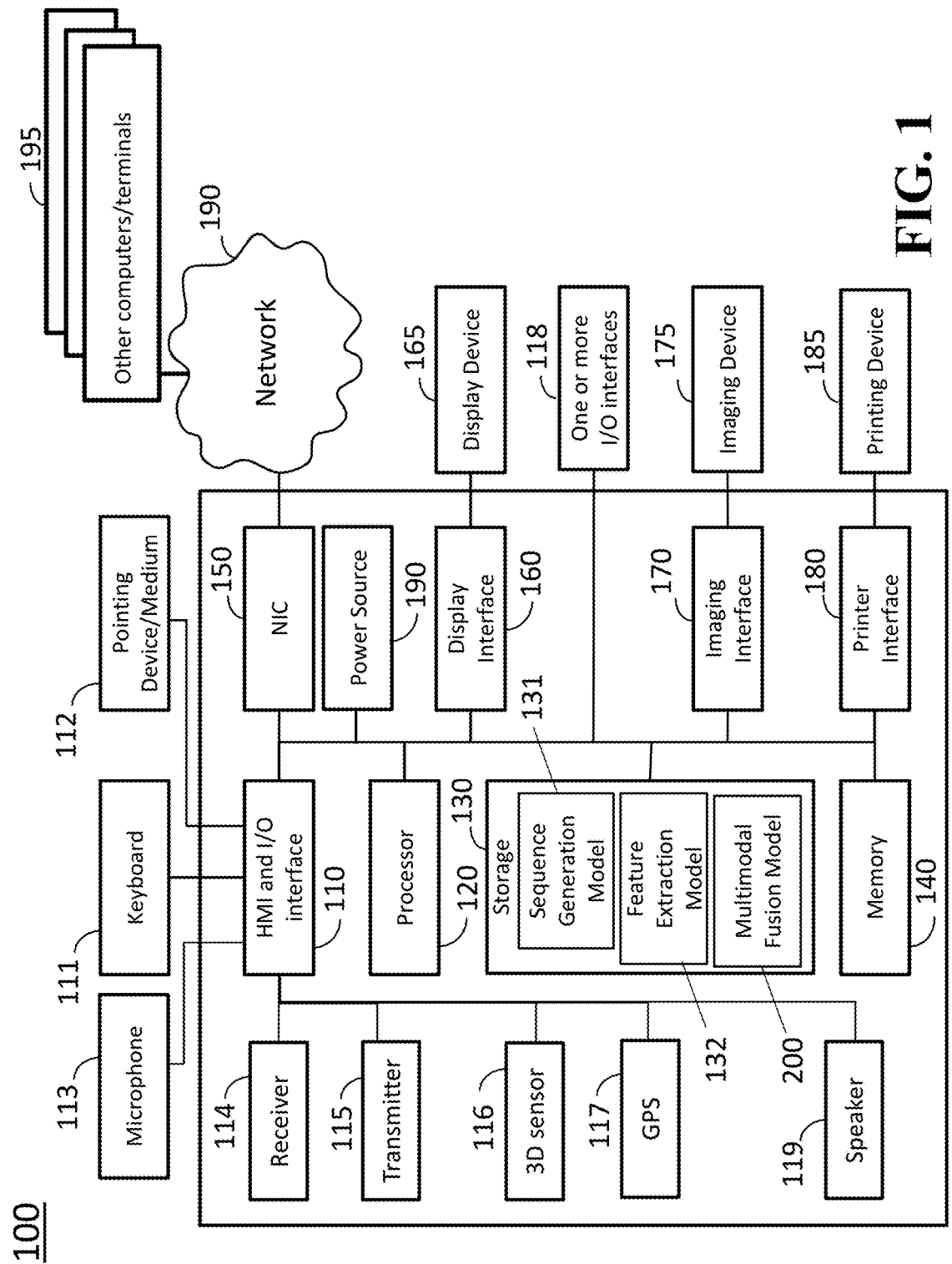
FIG. 1 is a block diagram illustrating a multimodal fusion system according to some embodiments of the present disclosure.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

In accordance with embodiments of the present disclosure, a system for generating a word sequence from multimodal input vectors includes one or more processors in connection with one of more memories and one or more storage devices storing instructions that are operable. When the instructions are executed by the one or more processors, the instructions cause the one or more processors to perform operations that include receiving first and second input vectors according to first and second sequential intervals, extracting first and second feature vectors using first and second feature extractors, respectively, from the first and second input, estimating a first set of weights and a second set of weights, respectively, from the first and second feature vectors and a prestep context vector of a sequence generator, calculating a first content vector from the first weight and the first feature vector, and calculating a second content vector from the second weight and the second feature vector, transforming the first content vector into a first modal content vector having a predetermined dimension and transforming the second content vector into a second modal content vector having the predetermined dimension, estimating a set of modal attention weights from the pre-step context vector and the first and second modal content vectors, generating a weighted content vector having the predetermined dimension from the set of modal attention weights and the first and second content vectors, and generating a predicted word using the sequence generator for generating the word sequence from the weighted content vector.

In this case, the first modal content vector, the second modal content vector and the weighted content vector have the same predetermined dimension. This makes it possible for the system to perform a multi-modal fusion model. In other words, by designing or determining dimensions of the input vectors and the weighted content vectors to have an identical dimension, those vectors can be easily handled in data processing of the multi-modal fusion model because those vectors are expressed by use of an identical data format having the identical dimension. As the data processing is simplified by using data transformed to have the identical dimension, the multi-modal fusion model method or system according to embodiments of the present disclosure can reduce central processing unit usage and power consumption for generating a word sequence from multi-modal input vectors.

Of cause, the number of the vectors may be changed to predetermined N vectors according to the requirement of system design. For instance, when the predetermined N is set to be three, the three input vectors can be image features, motion features and audio features obtained from image data, video signals and audio signals received via an input/output interface included in the system.

In some cases, the first and second sequential intervals may be an identical interval, and the first and second vectors may be different modalities.

FIG. 1 shows a block diagram of a multimodal fusion system 100 according to some embodiments of the present disclosure. The multimodal fusion system 100 can include a human machine interface (HMI) with input/output (I/O) interface 110 connectable with a keyboard 111 and a pointing device/medium 112, a microphone 113, a receiver 114, a transmitter 115, a 3D sensor 116, a global positioning system (GPS) 117, one or more I/O interfaces 118, a processor 120, a storage device 130, a memory 140, a network interface controller 150 (NIC) connectable with a network 155 including local area networks and internet network (not shown), a display interface 160 connected to a display device 165, an imaging interface 170 connectable with an imaging device 175, a printer interface 180 connectable with a printing device 185. The HMI with I/O interface 110 may include analog/digital and digital/analog converters. The HMI with I/O interface 110 includes a wireless communication interface that can communicate with other 3D point cloud display systems or other computers via wireless internet connections or wireless local area networks, which enable to construct multiple 3D point clouds. The 3D point cloud system 100 can include a power source 190. The power source 190 may be a battery rechargeable from an external power source (not shown) via the I/O interface 118. Depending upon the application the power source 190 may be optionally located outside of the system 100.

The HMI and I/O interface 110 and the I/O interface 118 can be adapted to connect to another display device (not shown) including a computer monitor, camera, television, projector, or mobile device, among others.

The multimodal fusion system 100 can receive electric text/imaging documents 195 including speech data via the network 155 connected to the NIC 150. The storage device 130 includes a sequence generation model 131, a feature extraction model 132 and a multimodal fusion model 200, in which algorithms of the sequence generation model 131, the feature extraction model 132 and the multimodal fusion model 200 are stored into the storage 130 as program code data. The algorithms of the models 131-132 and 200 may be stored to a computer readable recording medium (not shown) so that the processor 120 can execute the algorithms of the models 131-132 and 200 by loading the algorithms from the medium. Further, the pointing device/medium 112 may include modules that read and perform programs stored on a computer readable recording medium.

In order to start performing the algorithms of the models 131-132 and 200, instructions may be transmitted to the system 100 using the keyboard 111, the pointing device/medium 112 or via the wireless network or the network 190 connected to other computers (not shown). The algorithms of the models 131-132 and 200 may be started in response to receiving an acoustic signal of a user by the microphone 113 using pre-installed conventional speech recognition program stored in the storage 130. Further, the system 100 includes a turn-on/off switch (not shown) to allow the user to start/stop operating the system 100.

The HMI and I/O interface 110 may include an analogy-digital (A/D) converter, a digital-analogy (D/A) converter and wireless signal antenna for connecting the network 190. Further the one or more than one I/O interface 118 may be connectable to a cable television (TV) network or a conventional television (TV) antenna receiving TV signals. The signals received via the interface 118 can be converted into digital images and audio signals, which can be processed according to the algorithms of the models 131-132 and 200 in connection with the processor 120 and the memory 140 so that video scripts are generated and displayed on the display device 165 with picture frames of the digital images while the sound of the acoustic of the TV signals are output via a speaker 19. The speaker may be included in the system 100, or an external speaker may be connected via the interface 110 or the I/O interface 118.

The processor 120 may be a plurality of processors including one or more than graphics processing units (GPUs). The storage 130 may include speech recognition algorithms (not shown) that can recognize speech signals obtained via the microphone 113.

The multimodal fusion system module 200, the sequence generation model 131 and the feature extraction model 132 may be formed by neural networks.

Figure 2A:
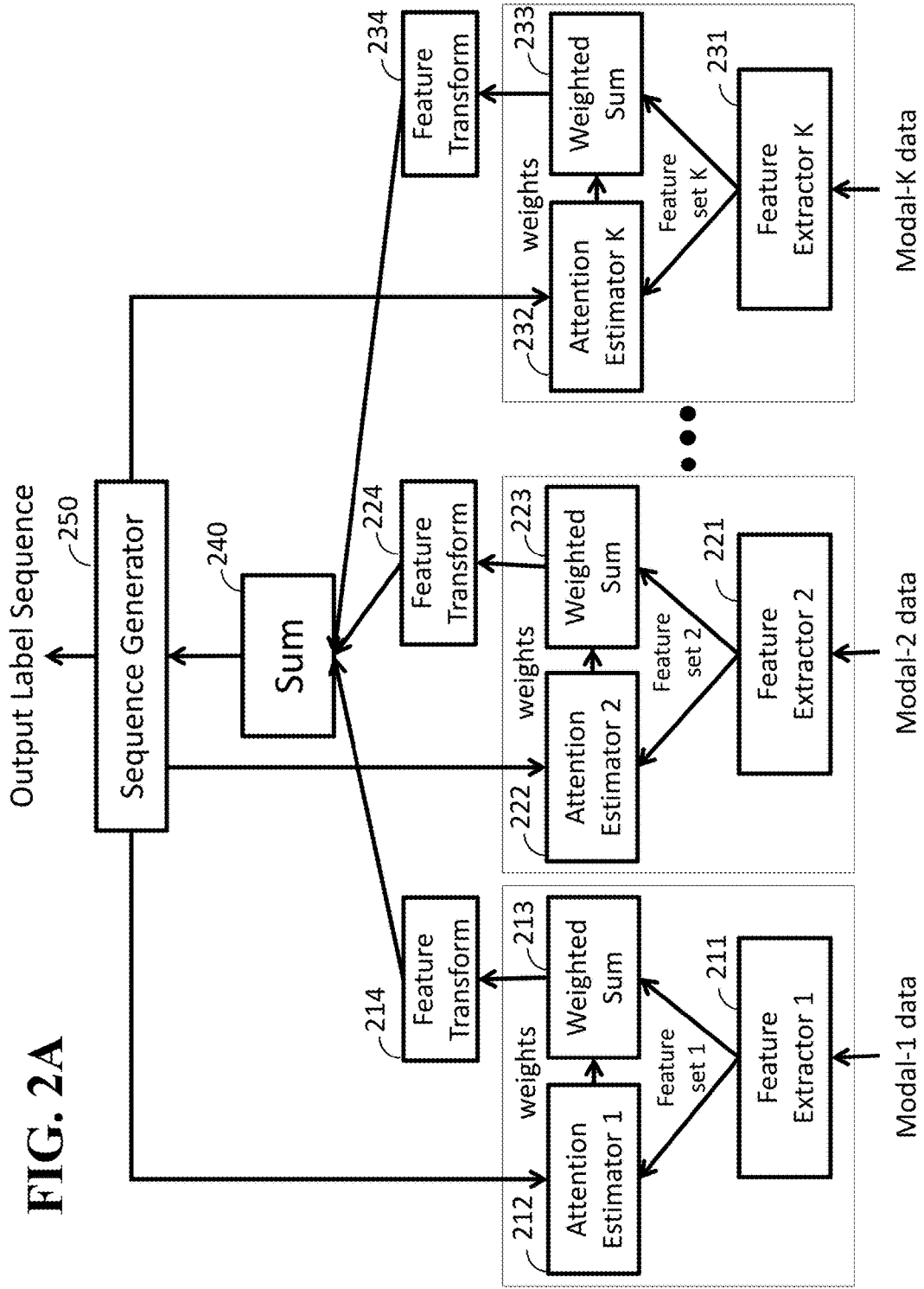
FIG. 2A is a block diagram illustrating a simple multimodal method according to embodiments of the present disclosure.

FIG. 2A is a block diagram illustrating a simple multimodal method according to embodiments of the present disclosure. The simple multimodal method can be performed by the processor 120 executing programs of the sequence generation model 131, the feature extraction model 132 and the multimodal fusion model 200 stored in the storage 130. The sequence generation model 131, the feature extraction model 132 and the multimodal fusion model 200 may be stored into a computer-readable recoding medium, so that the simple multimodal method can be performed when the processor 120 loads and executes the algorithms of the sequence generation model 131, the feature extraction model 132 and the multimodal fusion model 200. The simple multimodal method is performed in combination of the sequence generation model 131, the feature extraction model 132 and the multimodal fusion model 200. Further, the simple multimodal method uses feature extractors 211, 221 and 231 (feature extractors 1~K), attention estimators 212, 222 and 232 (attention estimators 1~K), weighted sum processors 213, 223 and 233 (weighted sum processors (calculators) 1~K), feature transformation modules 214, 224 and 234 (feature transformation modules 1~K), a simple sum processor (calculator) 240 and a Sequence Generator 250.

Figure 2B:
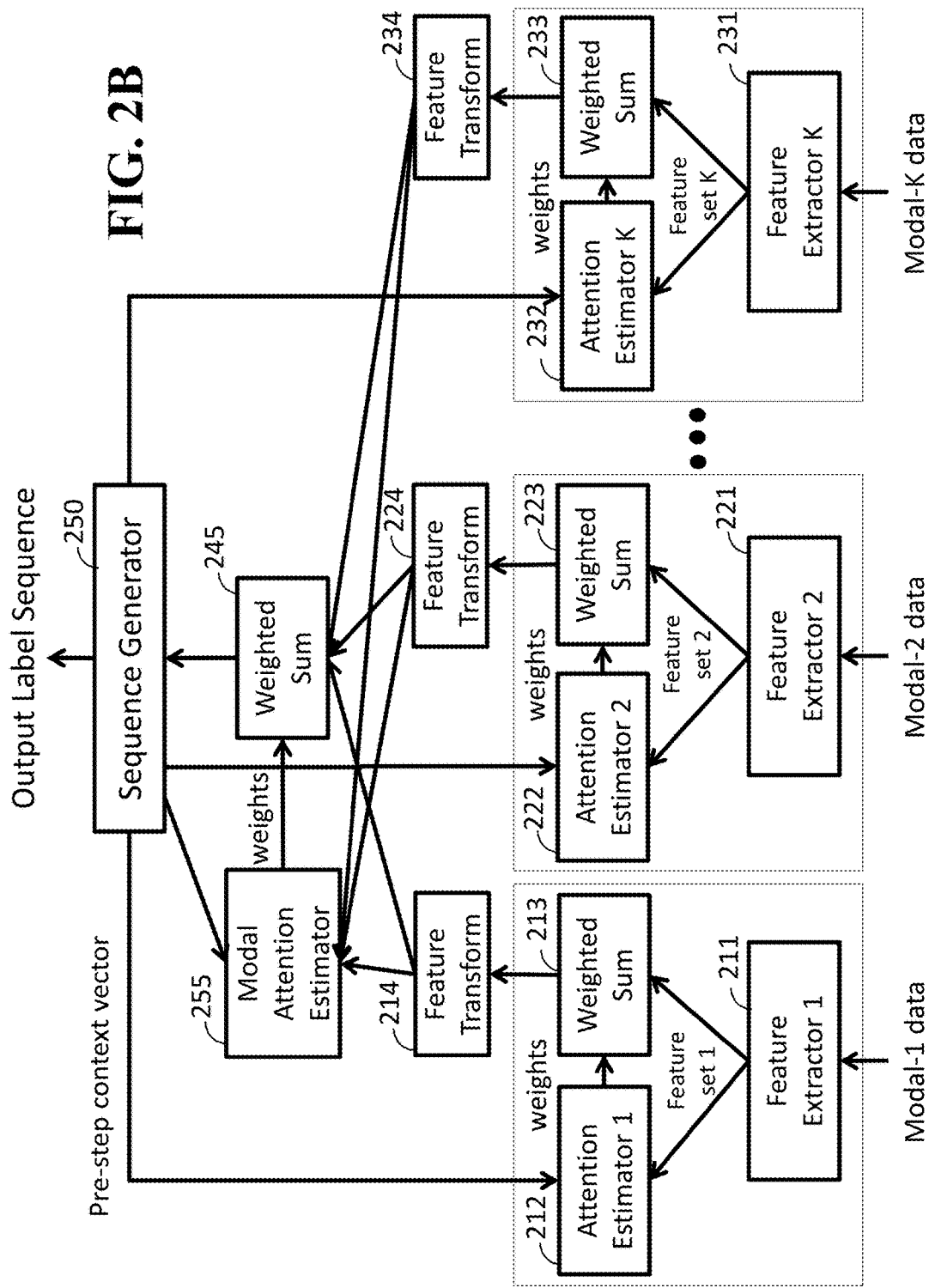
FIG. 2B is a block diagram illustrating a multimodal attention method according to embodiments of the present disclosure.

FIG. 2B is a block diagram illustrating a multimodal attention method according to embodiments of the present disclosure. In addition to the feature extractors 1~K, the attention estimators 1~K, the weighted sum processors 1~K, the feature transformation modules 1~K and the Sequence Generator 250, the multimodal attention method further includes a modal attention estimator 255 and a weighted sum processor 245 instead of using the simple sum processor 240. The multimodal attention method is performed in combination of the sequence generation model 131, the feature extraction model 132 and the multimodal fusion model 200. In both methods, the sequence generation model 131 provides the Sequence Generator 250 and the feature extraction model 132 provides the feature extractors 1~K. Further, the feature transformation modules 1~K, the modal attention estimator 255 and the weighted sum processors 1~K and the weighted sum processor 245 may be provided by the multimodal fusion model 200.

Given multimodal video data including K modalities such that K≥2 and some of the modalities may be the same, Modal-1 data are converted to a fixed-dimensional content vector using the feature extractor 211, the attention estimator 212 and the weighted-sum processor 213 for the data, where the feature extractor 211 extracts multiple feature vectors from the data, the attention estimator 212 estimates each weight for each extracted feature vector, and the weighted-sum processor 213 outputs (generates) the content vector computed as a weighted sum of the extracted feature vectors with the estimated weights. Modal-2 data are converted to a fixed-dimensional content vector using the feature extractor 221, the attention estimator 222 and the weighted-sum processor 223 for the data. Until Modal-K data, K fixed-dimensional content vectors are obtained, where the feature extractor 231, the attention estimator 232 and the weighted-sum processor 233 are used for Modal-K data. Each of Modal-1, Modal-2, ..., Modal-K data may be sequential data in a time sequential order with an interval or other predetermined orders with predetermined time intervals.

Each of the K content vectors is then transformed (converted) into a N-dimensional vector by each feature transformation modules 214, 224, and 234, and K transformed N-dimensional vectors are obtained, where N is a predefined positive integer.

The K transformed N-dimensional vectors are summed into a single N-dimensional content vector in the simple multimodal method of FIG. 2A, whereas the vectors are converted to a single N-dimensional content vector using the modal attention estimator 255 and the weighted-sum processor 245 in the multimodal attention method of FIG. 2B, wherein the modal attention estimator 255 estimates each weight for each transformed N-dimensional vector, and the weighted-sum processor 245 outputs (generates) the N-dimensional content vector computed as a weighted sum of the K transformed N-dimensional vectors with the estimated weights.

The Sequence Generator 250 receives the single N-dimensional content vector and predicts one label corresponding to a word of a sentence that describes the video data. For predicting the next word, the Sequence Generator 250 provides contextual information of the sentence, such as a vector that represents the previously-generated words, to the attention estimators 212, 222, 232 and the modal attention estimator 255 for estimating the attention weights to obtain appropriate content vectors. The vector may be referred to as a pre-step (or prestep) context vector.

The Sequence Generator 250 predicts the next word beginning with the start-of-sentence token, "<sos>," and generates a descriptive sentence or sentences by predicting the next word (predicted word) iteratively until a special symbol "<eos>" corresponding to "end of sentence" is predicted. In other words, the Sequence Generator 250 generates a word sequence from multi-modal input vectors. In some cases, the multi-modal input vectors may be received via different input/output interface such as the HMI and I/O interface 110 or one or more I/O interfaces 118.

In each generating process, a predicted word is generated to have a highest probability in all possible words given from the weighted content vector and the prestep context vector. Further, the predicted word can be accumulated into the memory 140, the storage device 130 or more storage devices (not shown) to generate the word sequence, and this accumulation process can be continued until the special symbol (end of sequence) is received. The system 100 can transmit the predicted words generated from the Sequence Generator 250 via the NIC 150 and the network 190, the HMI and I/O interface 110 or one or more I/O interfaces 118, so that the data of the predicted words can be used other computers 195 or other output devices (not shown).

When each of the K content vectors comes from a distinct modality data and/or through a distinct feature extractor, modality or feature fusion with the weighted-sum of the K transformed vectors enables a better prediction of each word by paying attention to different modalities and/or different features according to the contextual information of the sentence. Thus, this multimodal attention method can utilize different features inclusively or selectively using attention weights over different modalities or features to infer each word of the description.

Further, the multimodal fusion model 200 in the system 100 includes a data distribution module (not shown), which receives multiple time-sequential data via the I/O interface 110 or 118 and distributes the received data into Modal-1, Modal-2, ..., Modal-K data, divides each distributed time-sequential data according to a mined interval or intervals, and then provides the Modal-1, Modal-2, ..., Modal-K data to the feature extractors 1~K, respectively.

In some cases, the multiple time-sequential data may be video signals and audio signals included in a video clip. When the video clip is used for Modal data, the system 100 uses the feature extractors 211, 221 and 231 (set K=3) in FIG. 2B. The video clip is provided to the feature extractors 211, 221 and 231 in the system 100 via the I/O interface 110 or 118. The feature extractors 211, 221 and 231 can extract image data, audio data and motion data, respectively, from the video clip as Modal-1 data, Modal-2 data and Modal-3 (e.g. K=3 in FIG. 2B). In this case, the feature extractors 211, 221 and 231 receive Modal-1 data, Modal-2 data and Modal-3 according to first, second and third intervals, respectively, from data stream of the video clip.

In some cases, the data distribution module may divide the multiple time-sequential data with predetermined different time intervals, respectively, when image features, motion features, or audio features can be captured with different time intervals.

Encoder-Decoder-Based Sentence Generator

An approach to video description can be based on sequence-to-sequence learning. The input sequence, i.e., image sequence, is first encoded to a fixed-dimensional semantic vector. Then the output sequence, i.e., word sequence, is generated from the semantic vector. In this case, both the encoder and the decoder (or generator) are usually modeled as Long Short-Term Memory (LSTM) networks.

Figure 3:
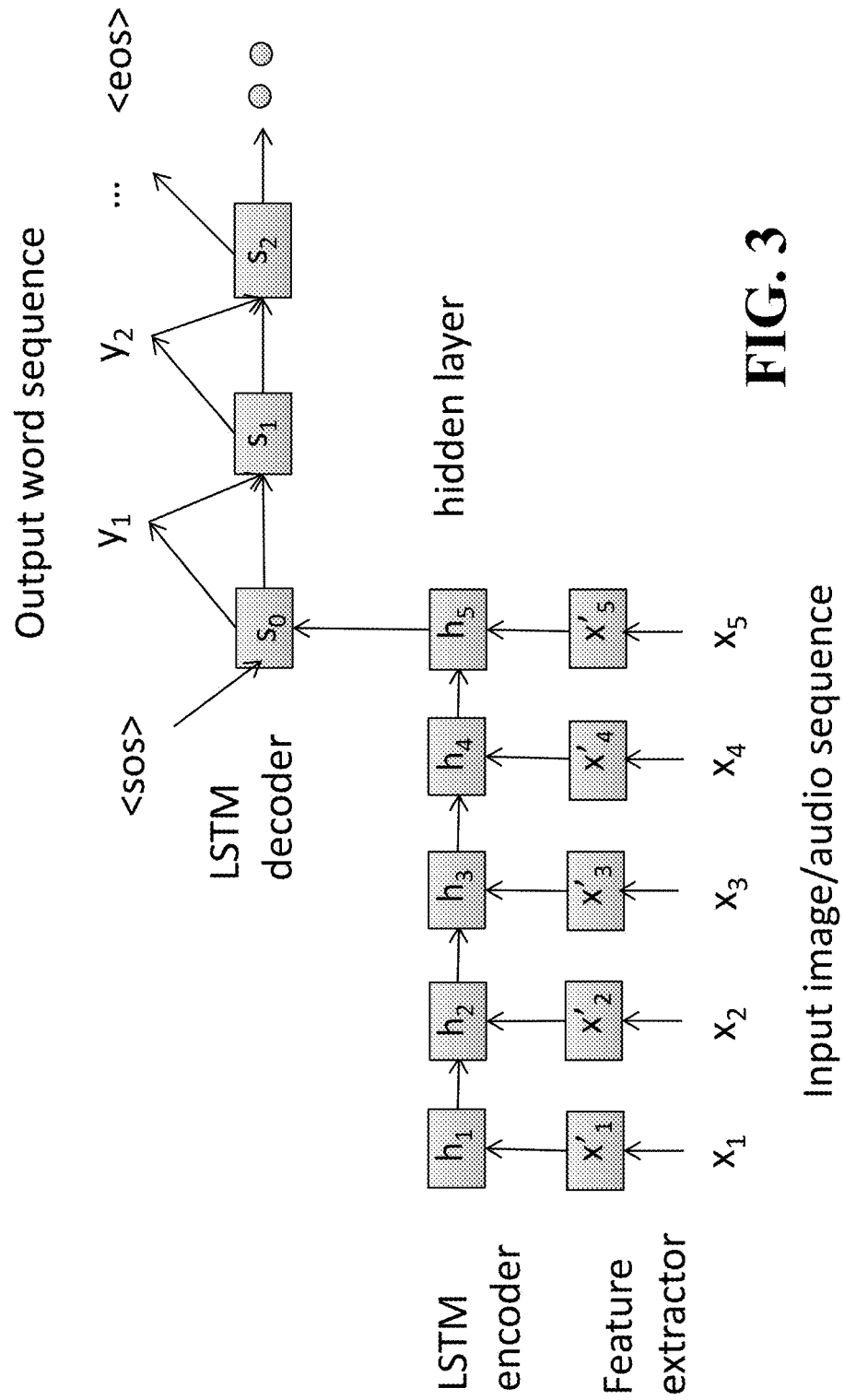
FIG. 3 is a block diagram illustrating an example of the LSTM-based encoder-decoder architecture according to embodiments of the present disclosure.

FIG. 3 shows an example of the LSTM-based encoder-decoder architecture. Given a sequence of images, $X=x_1, x_2, \ldots, x_L$, each image is first fed to a feature extractor, which can be a pretrained Convolutional Neural Network (CNN) for an image or video classification task such as GoogLeNet, VGGNet, or C3D. The sequence of image features, $X'=x'_1, x'_2, \ldots, x'_L$, is obtained by extracting the activation vector of a fully-connected layer of the CNN for each input image. The sequence of feature vectors is then fed to the LSTM encoder, and the hidden state of the LSTM is given by $$h_t = \text{LSTM}(h_{t-1}, x'_t; \lambda_E), \quad (1)$$

where the LSTM function of the encoder network $\lambda_E$ is computed as $$\text{LSTM}(h_{t-1}, x_t; \lambda) = o_t \tan h(c_t), \quad (2)$$

$$\text{where } o_t = \sigma(W_{xo}^{(\lambda)} x_t + W_{ho}^{(\lambda)} h_{t-1} + b_o^{(\lambda)}) \quad (3)$$

$$c_t = f_t c_{t-1} + i_t \tan h(W_{xc}^{(\lambda)} x_t + W_{hc}^{(\lambda)} h_{t-1} + b_c^{(\lambda)}) \quad (4)$$

$$f_t = \sigma(W_{xf}^{(\lambda)} x_t + W_{hf}^{(\lambda)} h_{t-1} + b_f^{(\lambda)}) \quad (5)$$

$$i_t = \sigma(W_{xi}^{(\lambda)} x_t + W_{hi}^{(\lambda)} h_{t-1} + b_i^{(\lambda)}), \quad (6)$$

where $\sigma(\ )$ is the element-wise sigmoid function, and $i_t$, $f_t$, to and $c_t$ are, respectively, the input gate, forget gate, output gate, and cell activation vectors for the t-th input vector. The weight matrices $W_{zz}^{(\lambda)}$ and the bias vectors $b_z^{(\lambda)}$ are identified by the subscript $z \in \{x, h, i, f, o, c\}$. For example, $W_{hi}$ is the hidden-input gate matrix and $W_{xo}$ is the input-output gate matrix. Peephole connections are not used in this procedure.

The decoder predicts the next word iteratively beginning with the start-of-sentence token, "<sos>" until it predicts the end-of-sentence token, "<eos>." The start-of-sentence token may be referred to as a start label, and the end-of sentence token may be referred to as an end label.

Given decoder state $s_{i-1}$, the decoder network $\lambda_D$ infers the next word probability distribution as $$P(y|s_{i-1}) = \text{softmax}(W_s^{(\lambda,D)} s_{i-1} + b_s^{(\lambda,D)}), \quad (7)$$

and generates word $y_i$, which has the highest probability, according to $$y_i = \underset{y \in V}{\text{argmax}} P(y|s_{i-1}), \quad (8)$$

where V denotes the vocabulary. The decoder state is updated using the LSTM network of the decoder as $$s_i = \text{LSTM}(s_{i-1}, y'_i; \lambda_D), \quad (9)$$

where $y'_i$ is a word-embedding vector of $y_m$, and the initial state so is obtained from the final encoder state $h_L$ and $y'_0 = \text{Embed}(<sos>)$ as in FIG. 3.

In the training phase, $Y = y_1, \ldots, y_M$ is given as the reference. However, in the test phase, the best word sequence needs to be found based on $$\hat{Y} = \underset{Y \in V^*}{\text{argmax}} P(Y|X) \quad (10)$$

$$= \underset{v_1, \ldots, y_M \in V^*}{\text{argmax}} P(y_1|s_0) P(y_2|s_1) \ldots \quad (11)$$

$$P(y_M|s_{M-1}) P(\langle eos \rangle|s_M).$$

Accordingly, a beam search in the test phase can be used to keep multiple states and hypotheses with the highest cumulative probabilities at each m-th step, and select the best hypothesis from those having reached the end-of-sentence token.

Attention-Based Sentence Generator

Another approach to video description can be an attention based sequence generator, which enables the network to emphasize features from specific times or spatial regions depending on the current context, enabling the next word to be predicted more accurately. Compared to the basic approach described above, the attention-based generator can exploit input features selectively according to the input and output contexts. The efficacy of attention models has been shown in many tasks such as machine translation.

Figure 4:
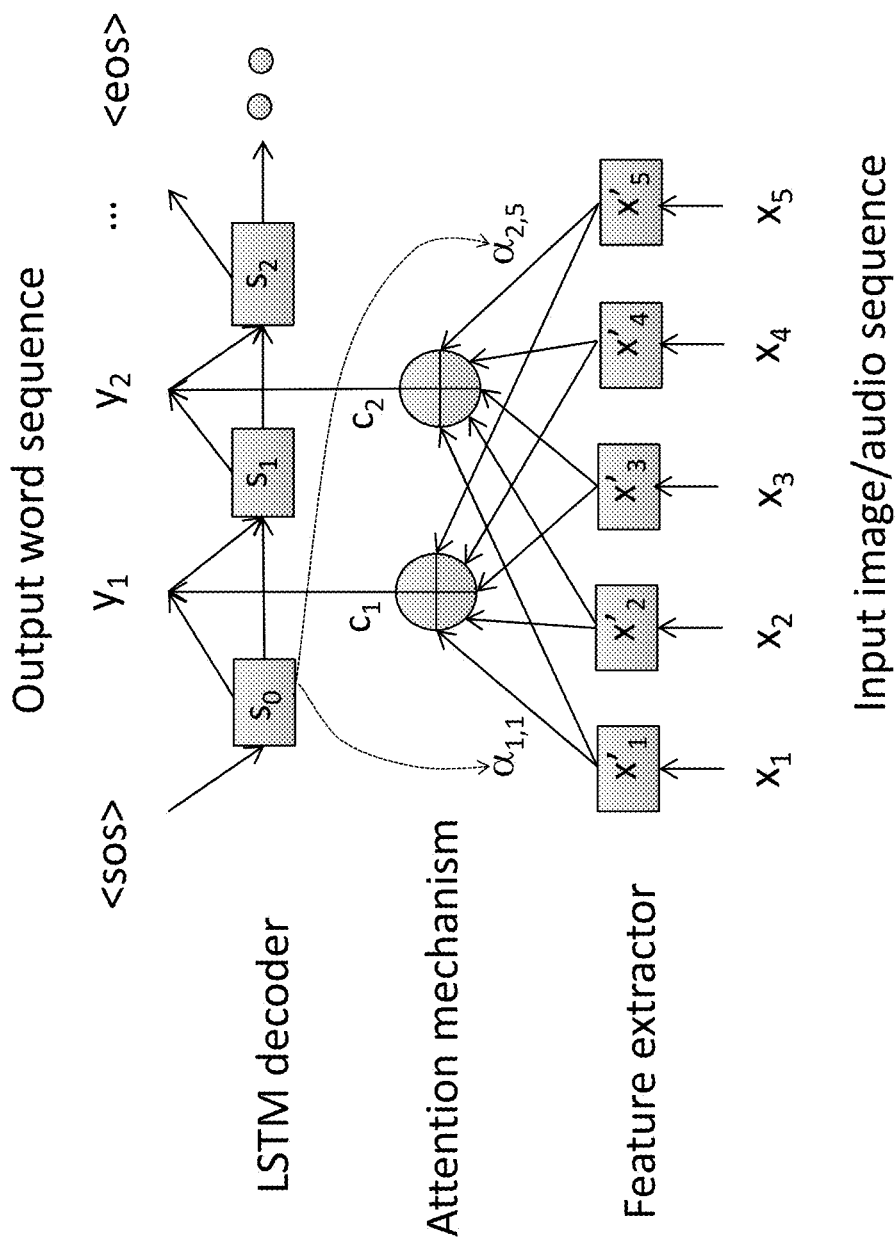
FIG. 4 is a block diagram illustrating an example of the attention-based sentence generator from video according to embodiments of the present disclosure.

FIG. 4 is a block diagram illustrating an example of the attention-based sentence generator from video, which has a temporal attention mechanism over the input image sequence. The input image sequence may be a time sequential order with predetermined time intervals. The input sequence of feature vectors is obtained using one or more feature extractors. In this case, attention-based generators may employ an encoder based on a bidirectional LSTM (BLSTM) or Gated Recurrent Units (GRU) to further convert the feature vector sequence as in FIG. 5 so that each vector contains its contextual information.

In video description tasks, however, CNN-based features may be used directly, or one or more feed-forward layer may be added to reduce the dimensionality.

Figure 5:
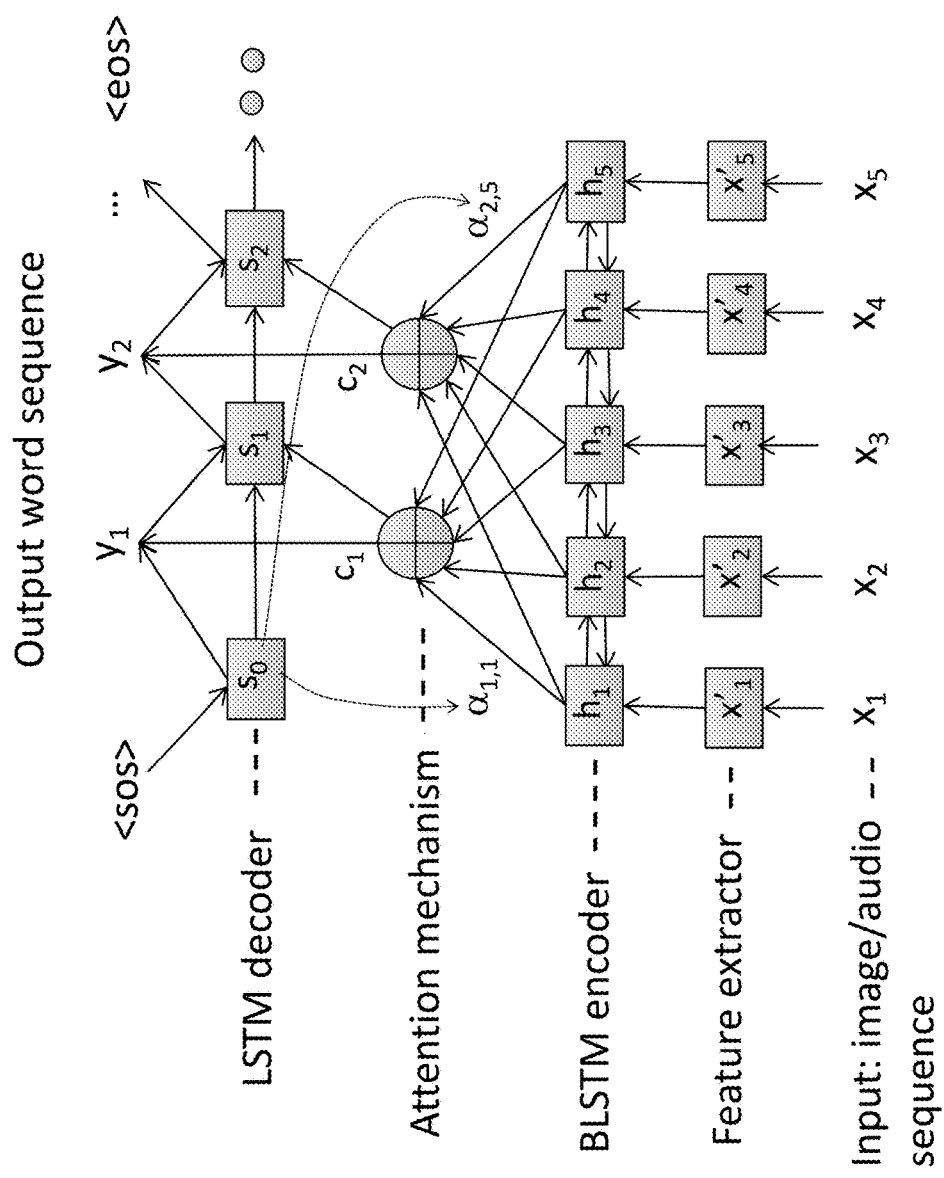
FIG. 5 is a block diagram illustrating an extension of the attention-based sentence generator from video according to embodiments of the present disclosure.

If an BLSTM encoder is used following the feature extraction as in FIG. 5, then the activation vectors (i.e., encoder states) can be obtained as $$h_t = \begin{bmatrix} h_t^{(f)} \\ h_t^{(b)} \end{bmatrix}, \quad (12)$$

where $h_t^{(f)}$ and $h_t^{(b)}$ are the forward and backward hidden activation vectors:

$$h_t^{(f)} = \text{LSTM}(h_{t-1}^{(f)}, x'_t; \lambda_E^{(f)}) \quad (13)$$

$$h_t^{(b)} = \text{LSTM}(h_{t+1}^{(b)}, x'_t; \lambda_E^{(b)}) \quad (14)$$

If a feed-forward layer is used, then the activation vector is calculated as $$h_t = \tan h(W_p x'_t + b_p), \quad (15)$$

where $W_p$ is a weight matrix and $b_p$ is a bias vector. Further, when the CNN features are directly used, then it is assumed to be $h_t = x_t$.

The attention mechanism is realized by using attention weights to the hidden activation vectors throughout the input sequence. These weights enable the network to emphasize features from those time steps that are most important for predicting the next output word.

Let $\alpha_{i,t}$ be an attention weight between the $i_{th}$ output word and the $t_{th}$ input feature vector. For the $i_{th}$ output, the vector representing the relevant content of the input sequence is obtained as a weighted sum of hidden unit activation vectors:

$$c_i = \sum_{t=1}^{L} \alpha_{i,t} h_t. \quad (16)$$

The decoder network is an Attention-based Recurrent Sequence Generator (ARSG) that generates an output label sequence with content vectors $c_i$. The network also has an LSTM decoder network, where the decoder state can be updated in the same way as Equation (9).

Then, the output label probability is computed as $$P(y|s_{i-1}, c_i) = \text{softmax}(W_s^{(\lambda,D)} s_{i-1} + W_c^{(\lambda,D)} c_i + b_s^{(\lambda,D)}), \quad (17)$$

and word $y_i$ is generated according to $$y_i = \underset{y \in V}{\operatorname{argmax}} P(y|s_{i-1}, c_i). \quad (18)$$

In contrast to Equations (7) and (8) of the basic encoder-decoder, the probability distribution is conditioned on the content vector ci, which emphasizes specific features that are most relevant to predicting each subsequent word. One more feed-forward layer can be inserted before the softmax layer. In this case, the probabilities are computed as follows:

$$g_i = \tan h(W_s^{(\lambda, D)} s_{i-1} + W_c^{(\lambda, D)} c_i + b_s^{(\lambda, D)}), \quad (19)$$

and $$P(y|s_{i-1}, c_i) = \operatorname{softmax}(W_g^{(\lambda, D)} g_i + b_g^{(\lambda, D)}), \quad (20)$$

The attention weights may be computed as $$\alpha_{i,t} = \frac{\exp(e_{i,t})}{\sum_{t=1}^{L} \exp(e_{i,t})} \quad (21)$$

and $$e_{i,t} = w_A^T \tan h(W_A s_{i-1} + V_A h_t + b_A), \quad (22)$$

where $W_A$ and $V_A$ are matrices, $w_A$ and $b_A$ are vectors, and $e_{i,t}$ is a scalar.

Attention-Based Multimodal Fusion

Embodiments of the present disclosure provide an attention model to handle fusion of multiple modalities, where each modality has its own sequence of feature vectors. For video description, multimodal inputs such as image features, motion features, and audio features are available. Furthermore, combination of multiple features from different feature extraction methods are often effective to improve the description accuracy.

In some cases, content vectors from VGGNet (image features) and C3D (spatiotemporal motion features) may be combined into one vector, which is used to predict the next word. This can be performed in the fusion layer. Let K be the number of modalities, i.e., the number of sequences of input feature vectors, the following activation vector is computed instead of Eq. (19), $$g_i = \tanh\left(W_s^{(\lambda D)} s_{i-1} + \sum_{k=1}^{K} d_{k,i} + b_s^{(\lambda D)}\right), \quad (23)$$

where $$d_{k,i} = W_{ck}^{(\lambda, D)} c_{k,i}, \quad (24)$$

and $c_{k,i}$ is the k-th content vector corresponding to the k-th feature extractor or modality.

Figure 6:
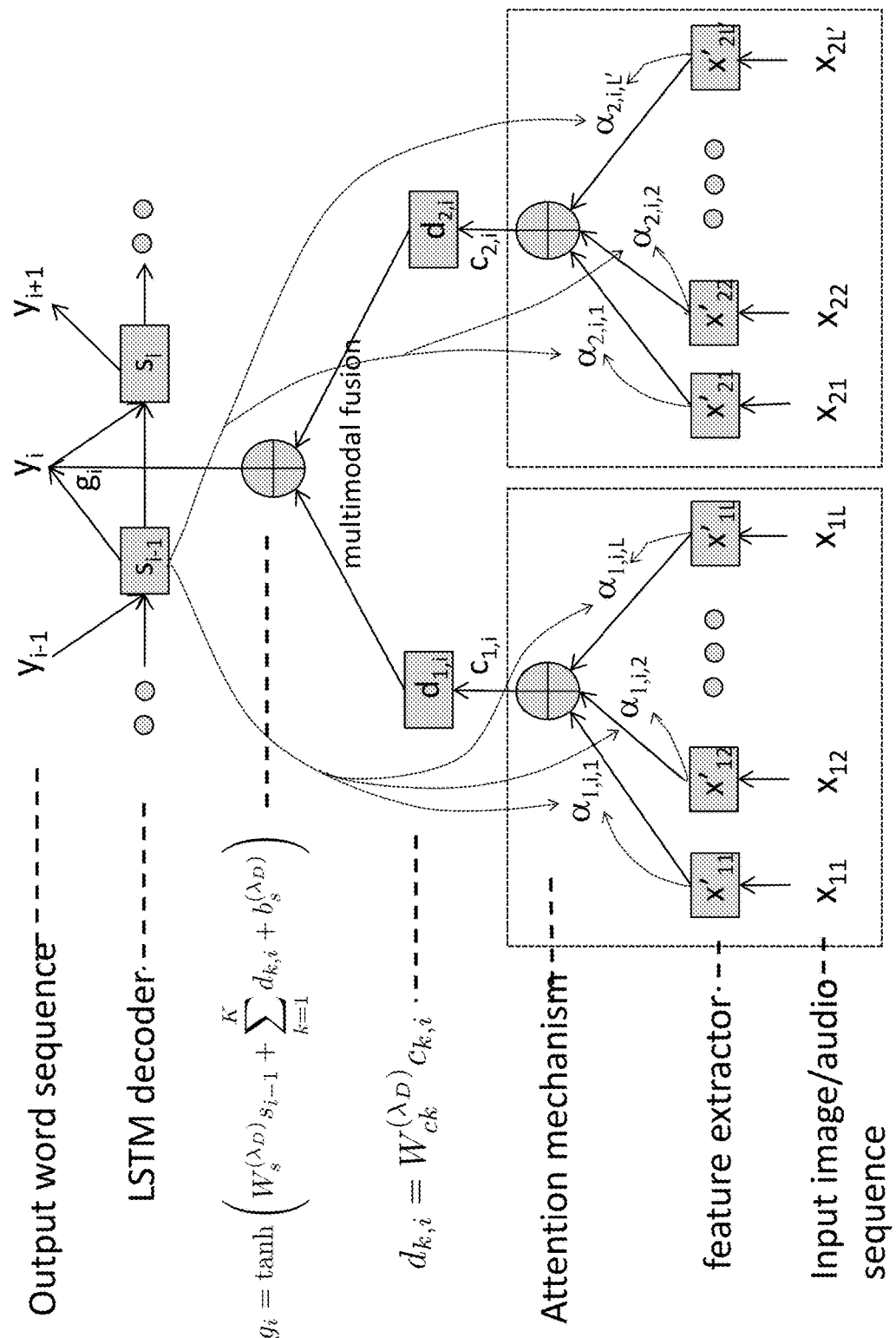
FIG. 6 is a diagram illustrating a simple feature fusion approach (simple multimodal method) according to embodiments of the present disclosure.

FIG. 6 shows the simple feature fusion approach (simple multimodal method) assuming K=2, in which content vectors are obtained with attention weights for individual input sequences $x_{11}, \ldots, x_{1L}$ and $x_{21}', \ldots, x_{2L}'$, respectively. However, these content vectors are combined with weight matrices $W_{c1}$ and $W_{c2}$, which are commonly used in the sentence generation step. Consequently, the content vectors from each feature type (or one modality) are always fused using the same weights, independent of the decoder state. This architecture may introduce the ability to exploit multiple types of features effectively for allowing the relative weights of each feature type (of each modality) to change based on the context.

According to embodiments of the present disclosure, the attention mechanism can be extended to multimodal fusion. Using the multimodal attention mechanism, based on the current decoder state, the decoder network can selectively attend to specific modalities of input (or specific feature types) to predict the next word. The attention-based feature fusion in accordance with embodiments of the present disclosure may be performed using $$g_i = \tanh\left(W_s^{(\lambda D)} s_{i-1} + \sum_{k=1}^{K} \beta_{k,i} d_{k,i} + b_s^{(\lambda D)}\right), \quad (25)$$

where $$d_{k,i} = W_{ck}^{(\lambda, D)} c_{k,i} + b_{ck}^{(\lambda, D)}. \quad (26)$$

The multimodal attention weights $\beta_{k,i}$ are obtained in a similar way to the temporal attention mechanism:

$$\beta_{k,i} = \frac{\exp(v_{k,i})}{\sum_{k=1}^{K} \exp(v_{k,i})}, \quad (27)$$

where $$v_{k,i} = w_B^T \tan h(W_B s_{i-1} + V_{Bk} c_{k,i} + b_{Bk}), \quad (28)$$

where $W_B$ and $V_{Bk}$ are matrices, $W_B$ and $b_{Bk}$ are vectors, and $v_{k,i}$ is a scalar.

Figure 7:
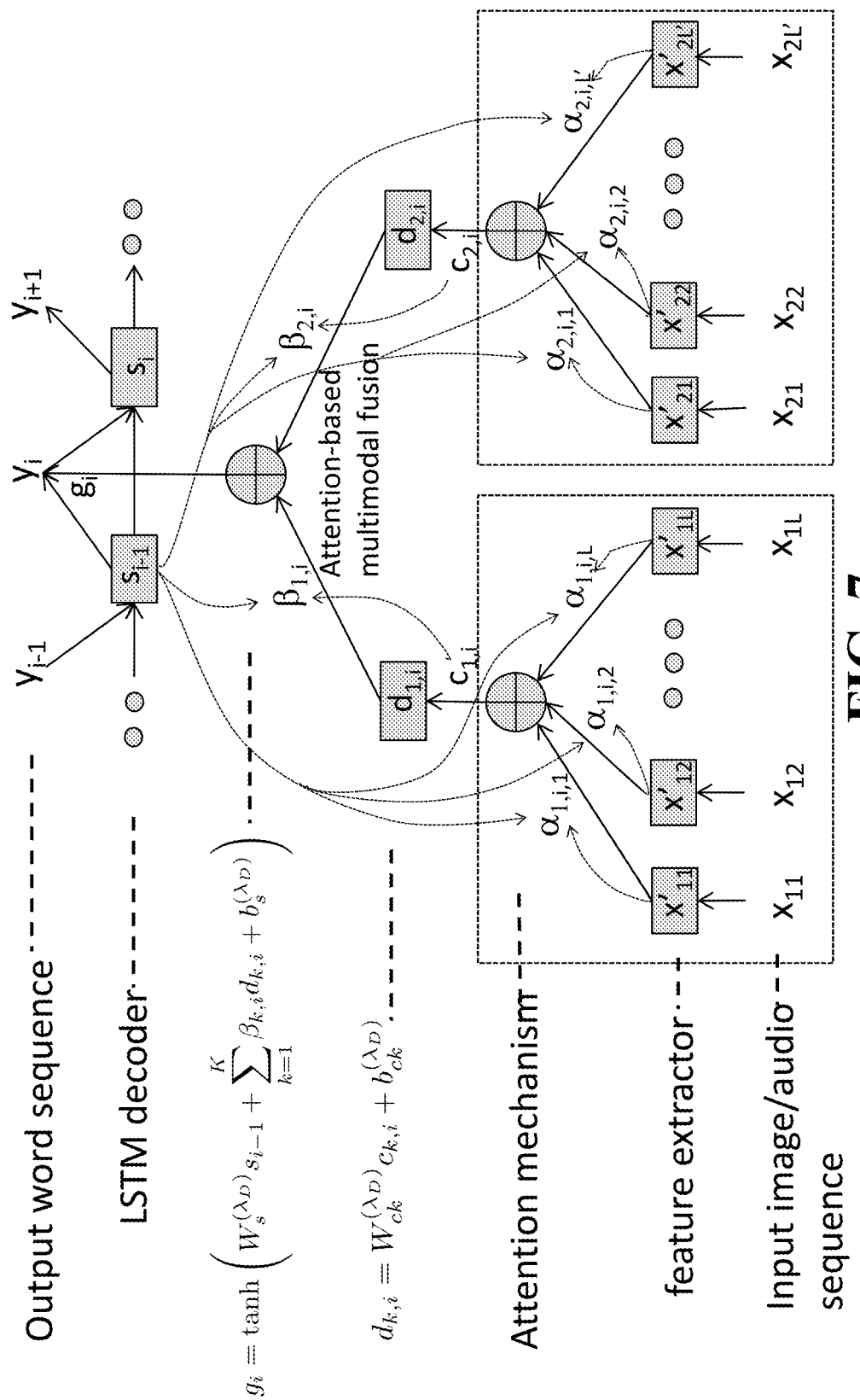
FIG. 7 is a diagram illustrating an architecture of a sentence generator according to embodiments of the present disclosure.

FIG. 7 shows the architecture of the sentence generator according to embodiments of the present disclosure, including the multimodal attention mechanism. Unlike the simple multimodal fusion method in FIG. 6, in FIG. 7, the feature-level attention weights can change according to the decoder state and the content vectors, which enables the decoder network to pay attention to a different set of features and/or modalities when predicting each subsequent word in the description.

Dataset for Evaluation

Some experimental results are described below for discussing the feature fusion according to an embodiments of the present disclosure using theYoutube2Text video corpus. This corpus is well suited for training and evaluating automatic video description generation models. The dataset has 1,970 video clips with multiple natural language descriptions. Each video clip is annotated with multiple parallel sentences provided by different Mechanical Turkers. There are 80,839 sentences in total, with about 41 annotated sentences per clip. Each sentence on average contains about 8 words. The words contained in all the sentences constitute a vocabulary of 13,010 unique lexical entries. The dataset is open-domain and covers a wide range of topics including sports, animals and music. The dataset is split into a training set of 1,200 video clips, a validation set of 100 clips, and a test set consisting of the remaining 670 clips.

Video Preprocessing

The image data are extracted from each video clip, which consist of 24 frames per second, and rescaled to 224×224 pixel images. For extracting image features, a pretrained GoogLeNet CNN (M. Lin, Q. Chen, and S. Yan. Network in network. CoRR, abs/1312.4400, 2013.) is used to extract fixed-length representation with the help of the popular implementation in Caffe (Y. Jia, E. Shelhamer, J. Donahue, S. Karayev, J. Long, R. Girshick, S. Guadarrama, and T. Darrell. Caffe: Convolutional architecture for fast feature embedding. arXiv preprint arXiv:1408.5093, 2014.). Features are extracted from the hidden layer pool5/7x7 s1. We select one frame out of every 16 frames from each video clip and feed them into the CNN to obtain 1024-dimensional frame-wise feature vectors.

We also use a VGGNet (K. Simonyan and A. Zisserman. Very deep convolutional networks for large-scale image recognition. CoRR, abs/1409.1556, 2014.) that was pretrained on the ImageNet dataset (A. Krizhevsky, I. Sutskever, and G. E. Hinton. Imagenet classification with deep convolutional neural networks. In F. Pereira, C. J. C. Burges, L. Bottou, and K. Q. Weinberger, editors, Advances in Neural Information Processing Systems 25, pages 1097-1105. Curran Associates, Inc., 2012.). The hidden activation vectors of fully connected layer fc7 are used for the image features, which produces a sequence of 4096-dimensional feature vectors. Furthermore, to model motion and short-term spatiotemporal activity, we use the pretrained C3D (D. Tran, L. D. Bourdev, R. Fergus, L. Torresani, and M. Paluri. Learning spatiotemporal features with 3d convolutional networks. In 2015 IEEE International Conference on Computer Vision, ICCV 2015, Santiago, Chile, Dec. 7-13, 2015, pages 4489-4497, 2015.) (which was trained on the Sports-1M dataset (A. Karpathy, G. Toderici, S. Shetty, T. Leung, R. Sukthankar, and L. Fei-Fei. Large-scale video classification with convolutional neural networks. In Proceedings of the IEEE conference on Computer Vision and Pattern Recognition, pages 1725-1732, 2014.)). The C3D network reads sequential frames in the video and outputs a fixed-length feature vector every 16 frames. Activation vectors were extracted from fully-connected layer fc6-1, which has 4096-dimensional features.

Audio Processing

Audio features are incorporated to use in the attention-based feature fusion method according to embodiments of the present disclosure. Since YouTube2Text corpus does not contain audio track, we extracted the audio data via the original video URLs. Although a subset of the videos were no longer available on YouTube, we were able to collect the audio data for 1,649 video clips, which covers 84% of the corpus. The 44 kHz-sampled audio data are down-sampled to 16 kHz, and Mel-Frequency Cepstral Coefficients (MFCCs) are extracted from each 50 ms time window with 25 ms shift. The sequence of 13-dimensional MFCC features are then concatenated into one vector from every group of 20 consecutive frames, which results in a sequence of 260-dimensional vectors. The MFCC features are normalized so that the mean and variance vectors are 0 and 1 in the training set. The validation and test sets are also adjusted with the original mean and variance vectors of the training set. Unlike with the image features, we apply a BLSTM encoder network for MFCC features, which is trained jointly with the decoder network. If audio data are missing for a video clip, then we feed in a sequence of dummy MFCC features, which is simply a sequence of zero vectors.

Setup for Describing Multi-Modal Data

The caption generation model, i.e. the decoder network, is trained to minimize the cross entropy criterion using the training set. Image features are fed to the decoder network through one projection layer of 512 units, while audio features, i.e. MFCCs, are fed to the BLSTM encoder followed by the decoder network. The encoder network has one projection layer of 512 units and bidirectional LSTM layers of 512 cells. The decoder network has one LSTM layer with 512 cells. Each word is embedded to a 256-dimensional vector when it is fed to the LSTM layer. We apply the AdaDelta optimizer (M. D. Zeiler. ADADELTA: an adaptive learning rate method. CoRR, abs/1212.5701, 2012.) to update the parameters, which is widely used for optimizing attention models. The LSTM and attention models were implemented using Chainer (S. Tokui, K. Oono, S. Hido, and J. Clayton. Chainer: a next generation open source framework for deep learning. In Proceedings of Workshop on Machine Learning Systems (Learn-7 ingSys) in The Twenty-ninth Annual Conference on Neural Information Processing Systems (NIPS), 2015).

The similarity between ground truth and automatic video description results are evaluated using machine-translation motivated metrics: BLEU (K. Papineni, S. Roukos, T. Ward, and W. Zhu. Bleu: a method for automatic evaluation of machine translation. In Proceedings of the 40th Annual Meeting of the Association for Computational Linguistics, Jul. 6-12, 2002, Philadelphia, Pa., USA., pages 311-318, 2002.), METEOR (M. J. Denkowski and A. Lavie. Meteor universal: Language specific translation evaluation for any target language. In Proceedings of the Ninth Workshop on Statistical Machine Translation, WMT@ACL 2014, Jun. 26-27, 2014, Baltimore, Md., USA, pages 376-380, 2014.), and the other metric for image description, CIDEr (R. Vedantam, C. L. Zitnick, and D. Parikh. Cider: Consensus-based image description evaluation. In IEEE Conference on Computer Vision and Pattern Recognition, CVPR 2015, Boston, Mass., USA, Jun. 7-12, 2015, pages 4566-4575, 2015.). We used the publicly available evaluation script prepared for image captioning challenge (X. Chen, H. Fang, T. Lin, R. Vedantam, S. Gupta, P. Doll'ar, and C. L. Zitnick. Microsoft COCO captions: Data collection and evaluation server. CoRR, abs/1504.00325, 2015.).

Evaluation Results

FIG. 8 shows comparisons of performance results obtained by conventional methods and the multimodal attention method according to embodiments of the present disclosure regarding the Youtube2text data set. The conventional methods are a simple additive multimodal fusion (Simple Multimodal), unimodal models with temporal attention (Unimodal), and baseline systems that used temporal attention, are performed.

The first three rows of the table use temporal attention but only one modality (one feature type). The next two rows do multimodal fusion of two modalities (image and spatiotemporal) using either Simple Multimodal fusion (see FIG. 6) or our proposed Multimodal Attention mechanism (see FIG. 7). The next two rows also perform multimodal fusion, this time of three modalities (image, spatiotemporal, and audio features). In each column, the scores of the top two methods are shown in boldface.

The Simple Multimodal model performed better than the Unimodal models. However, the Multimodal Attention model outperformed the Simple Multimodal model. The audio feature degrades the performance of the baseline because some YouTube data includes noise such as background music, which is unrelated to the video content. The Multimodal Attention model mitigated the impact of the noise of the audio features. Moreover, combining the audio features using our proposed method reached the best performance of CIDEr for all experimental conditions.

Accordingly, Multimodal Attention model improves upon the Simple Multimodal.

FIGS. 9A, 9B, 9C and 9D show comparisons of performance results obtained by conventional methods and the multimodal attention method according to embodiments of the present disclosure.

Figure 9A:
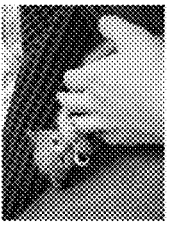
FIGS. 9A, 9B, 9C and 9D show comparisons of performance results obtained by conventional methods and the multimodal attention method according to embodiments of the present disclosure; and While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.
Figure 9B:
Figure 9C:
Figure 9D:
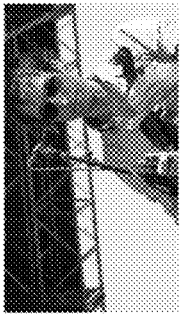

FIGS. 9A-9C show three example video clips, for which the attention-based multimodal fusion method (Temporal & Multimodal attention with VGG and C3D) outperformed the single modal method (Temporal attention with VGG) and the simple modal fusion method (Temporal attention with VGG and C3D) in CIDEr measure. FIG. 9D shows an example video clip, for which the attention-based multimodal fusion method (Temporal & Multimodal attention) including audio features outperformed the single modal method (Temporal attention with VGG), the simple modal fusion method (Temporal attention with VGG, C3D) with/without audio features. These examples show efficacy of multimodal attention mechanism.

In some embodiments of the present disclosure, when the multi-modal fusion model described above is installed in a computer system, video script can be effectively generated with less computing power, thus the use of the multi-modal fusion model method or system can reduce central processing unit usage and power consumption.

Further, embodiments according to the present disclosure provide effective method for performing the multimodal fusion model, thus, the use of a method and system using the multimodal fusion model can reduce central processing unit (CPU) usage, power consumption and/or network band width usage.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Further, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A system for generating a word sequence from multimodal input vectors, comprising:
   one or more processors in connection with a memory and one or more storage devices storing instructions that are operable, when executed by the one or more processors, to cause the one or more processors to perform operations comprising:
   receiving first and second input vectors according to first and second sequential intervals;
   extracting first and second feature vectors using first and second feature extractors, respectively, from the first and second input;
   estimating a first set of weights and a second set of weights, respectively, from the first and second feature vectors and a prestep context vector of a sequence generator;
   calculating a first content vector from the first set of weights and the first feature vectors, and calculating a second content vector from the second set of weights and the second feature vectors;
   tranforming the first content vector into a first modal content vector having a predetermined dimension and tranforming the second content vector into a second modal content vector having the predetermined dimension;
estimating a set of modal attention weights from the pre-step context vector and the first and second content vectors or the first and second modal content vectors;
generating a weighted content vector having the predetermined dimension from the set of modal attention weights and the first and second modal content vectors; and
generating a predicted word using the sequence generator for generating the word sequence from the weighted content vector.

2. The system of claim 1, wherein the first and second sequential intervals are an identical interval.

3. The system of claim 1, wherein the first and second input vectors are different modalies.

4. The system of claim 1, wherein the operations further comprising:
   accumulating the predicted word into the memory or the one or more storage devices to generate the word sequence.

5. The system of claim 4, wherein the accumulating is continued until an end label is received.

6. The system of claim 1, wherein the operations further comprising:
   transmitting the predicted word generated from the sequence generator.

7. The system of claim 1, wherein the first and second feature extractors are pretrained Convolutional Neural Networks (CNNs) having been trained for an image or a video classification task.

8. The system of claim 1, wherein the feature extractors are Long Short-Term Memory (LSTM) networks.

9. The system of claim 1, wherein the predicted word having a highest probability in all possible words given the weighted content vector and the prestep context vector is determined.

10. The system of claim 1, wherein the sequence generator employs a Long Short-Term Memory (LSTM) network.

11. The system of claim 1, wherein the first input vector is received via a first input/output (I/O) interface and the second input vector is received via a second I/O interface.

12. A non-transitory computer-readable medium storing software for generating a word sequence from multi-modal input vectors, comprising instructions executable by one or more processors which, upon such execution, cause the one or more processors in connection with a memory to perform operations comprising:

receiving first and second input vectors according to first and second sequential intervals;

extracting first and second feature vectors using first and second feature extractors, respectively, from the first and second input;

stimating a first set of weights and a second set of weights, respectively, from the first and second feature vectors and a prestep context vector of a sequence generator;

calculating a first content vector from the first set of weights and the first feature vectors, and calculating a second content vector from the second set of weights and the second feature vectors;

tranforming the first content vector into a first modal content vector having a predetermined dimension and tranforming the second content vector into a second modal content vector having the predetermined dimension;

estimating a set of modal attention weights from the pre-step context vector and the first and second content vectors or the first and second modal content vectors;

generating a weighted content vector having the predetermined dimension from the set of modal attention weights and the first and second modal content vectors; and generating a predicted word using the sequence generator for generating the word sequence from the weighted content vector.

13. The computer-readable medium of claim 12, wherein the first and second sequential intervals are an identical interval.

14. The computer-readable medium of claim 12, wherein the first and second input vectors are different modalies.

15. The computer-readable medium of claim 12, wherein the operations further comprising:

accumulating the predicted word into the memory or the one or more storage devices to generate the word sequence.

16. The computer-readable medium of claim 15, wherein the accumulating is continued until an end label is received.

17. The computer-readable medium of claim 12, wherein the operations further comprising:

transmitting the predicted word generated from the sequence generator.

18. The computer-readable medium of claim 12, wherein the first and second feature extractors are pretrained Convolutional Neural Networks (CNNs) having been trained for an image or a video classification 6task.

19. A method for generating a word sequence from multi-modal input, comprising:

receiving first and second input vectors according to first and second sequential intervals;

extracting first and second feature vectors using first and second feature extractors, respectively, from the first and second input;

estimating a first set of weights and a second set of weights, respectively, from the first and second feature vectors and a prestep context vector of a sequence generator;

calculating a first content vector from the first set of weights and the first feature vectors, and calculating a second content vector from the second set of weights and the second feature vectors;

tranforming the first content vector into a first modal content vector having a predetermined dimension and tranforming the second content vector into a second modal content vector having the predetermined dimension;

estimating a set of modal attention weights from the prestep context vector and the first and second content vectors or the first and second modal content vectors;

generating a weighted content vector having the predetermined dimension from the set of modal attention weights and the first and second modal content vectors; and generating a predicted word using the sequence generator for generating the word sequence from the weighted content vector.

20. The method of claim 19, wherein the first and second sequential intervals are an identical interval.

* * * * *